E. HOLMES & H. C. ROOME,

Assignor, by mesne assignments, to the HOLMES BURGLAR ALARM TELEGRAPH CO.

Electrical-Envelope for Safes, Vaults, &c.

No. 8,950. Reissued Oct. 28, 1879.

*Witnesses:*

Henry Eichling

Geo. A. Smith

*Inventor:*

Edwin Holmes &

Henry C. Roome by Saml. A. Duncan atty.

THE NORRIS PETERS CO., PHOTO-LITHO., WASHINGTON, D. C.

UNITED STATES PATENT OFFICE.

EDWIN HOLMES, OF BROOKLYN, NEW YORK, AND HENRY C. ROOME, OF JERSEY CITY, NEW JERSEY, ASSIGNORS, BY MESNE ASSIGNMENTS, TO HOLMES BURGLAR ALARM TELEGRAPH COMPANY, OF NEW YORK CITY.

IMPROVEMENT IN ELECTRICAL ENVELOPES FOR SAFES, VAULTS, &c.

Specification forming part of Letters Patent No. 110,362, dated December 20, 1870; Reissue No. 8,950, dated October 28, 1879; application filed October 8, 1879.

DIVISION B.

*To all whom it may concern:*

Be it known that we, EDWIN HOLMES, of the city of Brooklyn, in the State of New York, and HENRY C. ROOME, of Jersey City, in the county of Hudson and State of New Jersey, have invented a new and useful Electro-Magnetic Envelope or Lining for Safes, Vaults, and other Structures, of which the following is a full, clear, and exact description, reference being had to the accompanying drawings, forming part of this specification, and in which—

Figure 1:
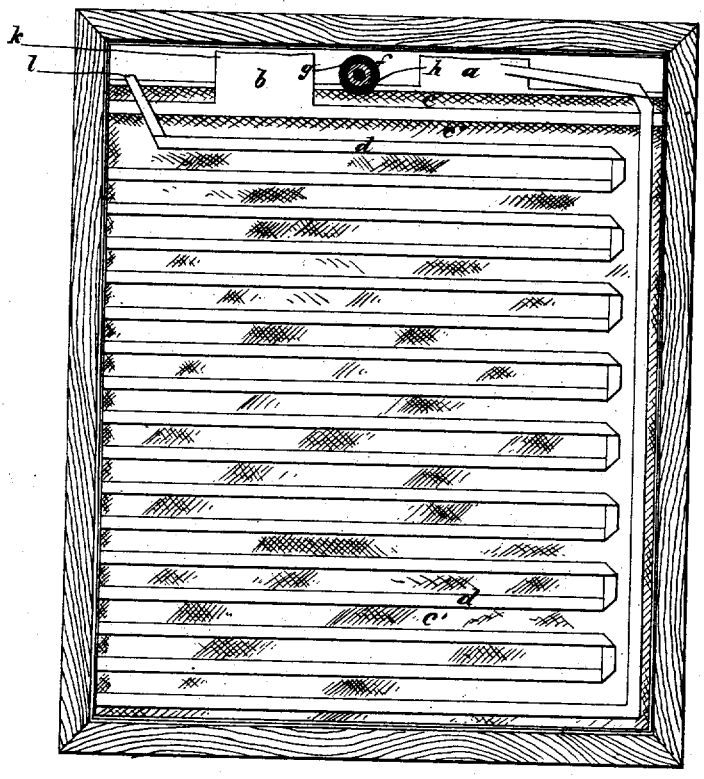
Figure 2:
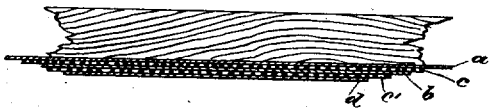

Figure 1 represents an interior face view of our improved envelope or lining as applied to one side of a safe or vault, or wooden case inclosing the same, and Fig. 2 a transverse section thereof in part.

Similar letters of reference indicate corresponding parts.

Our invention relates to electro-magnetic attachments for safes, vaults, and other structures or inclosures which it may be desired to protect against burglary or any improper interference; and, in general, its object is to provide an envelope or a lining of such a nature, that when it is properly connected with a battery and an alarm apparatus, any breach made in the walls of the structure or in the envelope, in attempting to reach the protected structure, will cause the alarm apparatus to give a signal.

To this end the invention consists in the peculiar construction and arrangement of the envelope or lining, as hereinafter described, and in the combination therewith of a resistance coil or medium to prevent short-circuiting without giving an alarm.

This envelope or lining is composed of a thin ribbon of metal mounted upon a sheet of some suitable non-conducting material as a support, which support is fitted to the walls of the safe, vault, or other structure to be protected, or of the casing inclosing the same. Preferably this ribbon should be of such thinness and frangibility as to be easily sundered, and to this end may be of a material not capable of withstanding the thrust even of a non-conducting and therefore non-metallic instrument; and it is to be arranged in convolutions or in a zigzag manner, so as the more completely to protect the entire surface, care, of course, being taken while arranging the contiguous convolutions near each other not to bring them into electrical connection. Tin-foil is an excellent material for the ribbon.

Referring to the drawings, *d* is a ribbon of metal mounted on the supporting-sheet *c'*. This insulating support *c'* we prefer to make of cloth or paper properly coated with gum-shellac, so that it, like the metallic ribbon itself, will be pliable, so that the whole may be applied in the form of a continuous sheet as an envelope or lining to the walls of a safe or vault, or to the inside of a wooden covering surrounding the same. This protecting-sheet thus prepared having been fitted and placed in position relatively to the walls of the structure, one end of the ribbon is connected with one pole of the battery by means of a suitable conducting-wire, *l*, while the other end is connected with the other pole of the battery by the wire *k*, the current, however, in making the circuit being caused to pass through a resistance-coil, *f*, or other suitable resisting medium introduced into the electric envelope or lining, as well as through an alarm apparatus located at any convenient point.

As shown in the drawings, the ribbon *d*, instead of connecting directly with the wire of the resistance-coil, connects with a thin metallic plate, *a*, which extends over the wall of the structure, and is properly insulated from the ribbon except at the one point of contact, and this plate *a* connects directly with the resistance-coil at the point *h*; and in like manner the drawings show the other end of the resistance-coil as connected at *g* with another metallic plate, *b*, which is extended over the wall of the structure, and which, by means of the plates *c* and *c'*, is insulated both from the plate *a* and from the ribbon *d*. These plates *a* and *b* constitute so many additional metallic layers or strata, underlying that which is composed of the ribbon, and thus, in connection with the ribbon and the resistance-coil, constitute a complete protection against short-circuiting that portion of the conductors which constitutes the electric envelope or lining.

This superposition of two or more metallic conductors properly insulated forms more particularly the subject of another division, A, of this reissue. As the present division has to do with the ribbon portion of the lining it is manifest that for the purposes hereof the plate *a* may be regarded simply as a prolongation of one end of the resistance-coil connecting the coil proper with the ribbon, and that the plate *b* may be regarded simply as a part of the conductor *k*, leading from the coil *f* back to the battery.

When the wires are connected, as described, with the poles of the battery, a slight current of electricity, passing over the wire *l* to the ribbon *d*, flows through the resistance-coil, and thence, by the wire *k*, back to the battery, or vice versa; and thus, by means of the ribbon, this current becomes practically diffused over the entire surface of the safe, vault, or structure.

Any attempt to penetrate to the interior of the safe or structure thus protected by making an opening through the walls thereof would result in the severing of the ribbon at the point where the breach should chance to be effected, and this would break the current and cause an alarm to be given. Any endeavor to avoid this result by short-circuiting the wires in such way as to cut the safe or any portion of it out from the circuit would be frustrated by the action of the resistance-coil, which, being introduced into that part of the circuit which forms the envelope or lining, is beyond the reach or inspection of the intermeddler. Being thus uninformed as to the construction and arrangement of the resistance-coil, he would be unable to substitute for it, when establishing his new circuit, a resistance of equal power, and, consequently, the result would be a change in the intensity of the transmitted current, and any variation in the strength of the current can be made to give an alarm by simply connecting the wires *k* and *l* with a galvanometer or instrument the movements of which are produced by variations in a current of electricity from a battery or other electrical apparatus in connection with the safe, vault, or other structure. A bell in connection with the apparatus may be used for the purpose of sounding the alarm.

Of course it is to be understood that the galvanometer and alarm, as well as the battery, are to be placed at any required distance from the structure to be protected.

We are aware that others have proposed to effect the protection of safes and similar structures by covering the surfaces of the same with wire conductors, through which a current of electricity was to be passed, with a magnet introduced into the circuit at the proper point, for the purpose of giving an alarm in case of the circuit being broken by the cutting or rupturing of the conductors; but we are not aware that any such prior system involved the combination, with an envelope or lining composed of an electric conductor arranged in convolutions over the surface to be protected, of a resistance coil or medium introduced into that portion of the circuit that forms the envelope or lining, and the use elsewhere in the circuit of a galvanometer or instrument capable of indicating by its movements variations in the intensity of the current produced otherwise than by the absolute breaking of the circuit, and thus giving notice of any short-circuiting of the line which leaves the resistance-coil out of the circuit.

Furthermore, wire, as previously employed for electric linings, is far less certain to be cut or sundered in the operation of working through the walls of the safe than is our improved ribbon form of conductor, since the tensile strength of the wire is such that it can much better resist the effect of heavy blows, and can much more easily be pushed aside without being severed.

Contrariwise, the ribbon-like form of the conductor which we use for our envelope or lining and the thinness which we give it render it almost certain that any violence sufficient to effect an entrance through the walls of the protected structure will produce a break in the conductor.

Again, independently of the fragile character of our thin metallic ribbon, a conductor of this form can be much more easily secured to its foundation than wire can be, since, if desired, it can readily be attached simply by gluing or cementing it on, which, with wire, would be difficult, if not practically impossible. The ribbon, moreover, can be applied more rapidly as well as more economically, since the same weight of metal in this form can be made to cover a larger space, and less difficulty will be experienced in arranging the contiguous convolutions and in effecting insulation of one winding from the adjacent ones, than would be the case with wire, and when once in use there will not be the same danger with the ribbon as with the wire, that by movements caused by constant or oft-repeated concussions or jars, will gradually wear a passage through the underlying non-conductor, and thus destroy the insulation, for which reason the ribbon makes it possible to use an insulating sheet of exceeding thinness, which is a desirable feature of construction.

What is claimed as new is—

1. In combination with a safe, vault, or other structure, or a casing surrounding the same, a thin ribbon of metal arranged in convolutions over the walls thereof, substantially as and for the purpose described.

2. An electric envelope or lining for safes, vaults, or other structures, composed of a ribbon of thin conducting material mounted and arranged in convolutions upon a sheet or layer of some pliable non-conducting material, substantially as and for the purpose described.

3. The combination of a ribbon of conducting material, arranged in convolutions over the walls of a safe, vault, or other structure, or of a casing surrounding the same, so as to form an electric envelope or lining for such structure, and a resistance coil or medium connected therewith and arranged to operate in connection with a galvanometer or instrument the movements of which are produced by variations in a current of electricity, substantially as and for the purpose described.

EDWIN HOLMES.
HENRY C. ROOME.

Witnesses:
ROBERT H. DUNCAN,
BENJ. A. SMITH.